United States Patent Office 3,391,175
Patented July 2, 1968

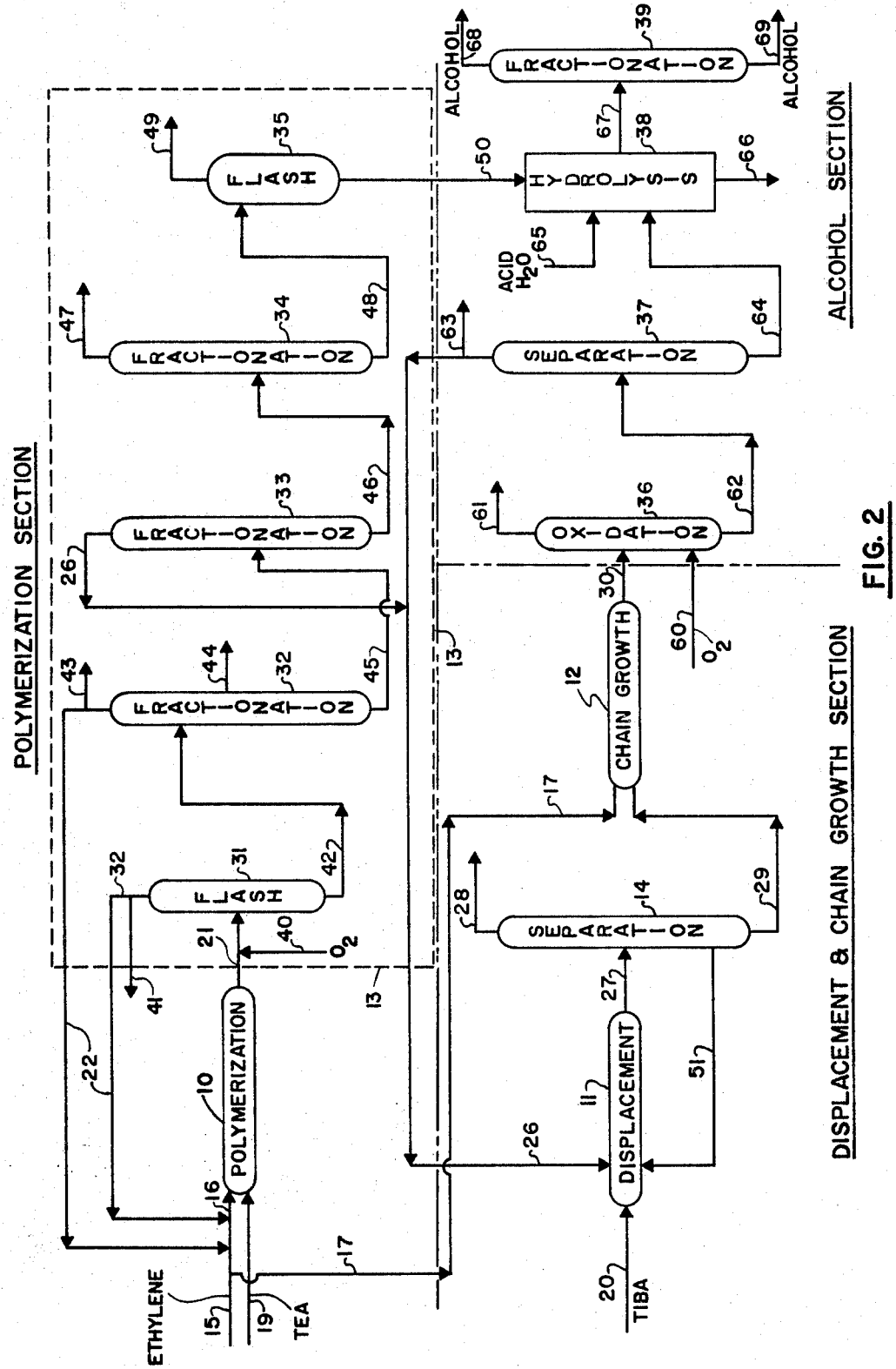

3,391,175
PROCESS FOR PRODUCING HIGH ALKYL TRI-
ALKYL ALUMINUM COMPOUNDS AND VINYL
OLEFINS
Wayne T. Davis, Baton Rouge, La., assignor to Ethyl
Corporation, New York, N.Y., a corporation of
Virginia
Continuation-in-part of application Ser. No. 175,916,
Feb. 27, 1962. This application June 26, 1964, Ser.
No. 378,139
7 Claims. (Cl. 260—448)

This application is a continuation-in-part of application Ser. No. 175,916, filed on Feb. 27, 1962, now abandoned.

This invention relates to the manufacture of ethylene derived chemicals. More particularly, the invention relates to a new and highly flexible technique and process whereby straight chain, normal alpha olefins of desired chain length or molecular weight, and aluminum alkyls, the alkyl substituents predominating in normal alkyl groups of desired chain length, can be produced readily and efficiently.

It is known that ethylene can be converted to higher molecular weight olefin hydrocarbons by polymerization or controlled polymerization in the presence of a catalyst of which an aluminum trialkyl is a particular species, other suitable catalysts being the corresponding alkyls of beryllium, gallium, or indium, as is taught in U.S. Patent 2,699,457. It is known that ethylene can be added, in molecular multiples, to such organometallics, i.e. aluminum trialkyls, or similar compounds of beryllium, to form, for example, aluminum trialkyls wherein the alkyl groups are of appreciably longer chain length. Such an operation is shown in U.S. Patent 2,826,598 and in Union of South Africa Patent 60/4695. Aluminum trialkyls which can be generated in this fashion are readily susceptible to the production of alcohols, corresponding to the alkyl groups present in the aluminum trialkyls, by the oxidation of the aluminum trialkyl and the hydrolysis of the resulting aluminum trialkoxide by an aqueous reagent selected from the group consisting of water and dilute acid, as is shown in U.S. Patent 2,892,858.

Despite the above described state of knowledge, these operations or chemical processes have found very little commercial usage for various reasons. One particular difficulty, with respect to the production of the olefins, is the difficulty in directing the catalytic polymerization to provide a product fraction of controlled and specific chemical characteristics and controlled and specific molecular weight range. Thus, following the general teachings of U.S. Patent 2,699,457, the product olefins obtained in catalytic manner contained large amounts of beta branched alpha olefins, herein termed vinylidene olefins. With respect to the conversion of a low molecular weight trialkyl aluminum feed, by reaction with ethylene, to a higher molecular weight trialkyl aluminum, followed by subsequent oxidation and hydrolysis, if desired, a somewhat similar difficulty exists. Thus, it is found particularly difficult to provide a trialkyl aluminum product wherein the alkyl groups have a desired chain length distribution. Because of these and other difficulties, the chemical discoveries of the previously mentioned patents have not been widely utilized in commerce.

The normal alpha olefins, or vinyl olefins, represent highly desirable chemical raw materials. These are suitable for subsequent polymerization operations, for alkylation of aromatic compounds to provide specific substituted aromatics which in turn can be used for synthesis of detergents, for conversion to straight chain normal alcohols, as solvents, etc. Normal primary alcohols, particularly in the molecular weight range of those having twelve to sixteen carbon atoms, are also highly desirable chemical materials, being particularly useful as such for detergent components. In addition, alcohols of the potential molecular weight size range indicated, i.e. from eight to twenty carbon atoms, are useful as starting materials for the esterification of inorganic or organic acids to provide specific esters. The trialkyl aluminum compounds, having controlled length alkyl groups are valuable materials in themselves, as plating agents, as reactants for making other organometallics, etc.

Despite the known end utility of vinyl olefins, trialkyl aluminum compounds, and alcohols of the class described, the above described processes have not been extensively utilized for the reasons named.

The object of the present invention is to provide a unique combination of (a) a catalyzed polymerization of ethylene and (b) a stoichiometric addition of ethylene to trialkyl aluminum. A more particular object is to provide a unique combination of operations including the above enumerated reactions, which combination is particularly susceptible to producing at will various final products. A preferred object is to allow the most efficient production of a normal alpha olefin product stream (hereinafter termed vinyl olefins), and an aluminum alkyl product stream, both of these being characterized by the already indicated chemical structure characteristics and controlled molecular weight. An additional object is to provide a process including polymerization and chain growth sections, in combination, which is susceptible of ready adjustment to produce selectable quantities of trialkyl aluminum and normal alpha olefins of the desired proportions. In other words, by the process combination herein disclosed, it is possible to provide a degree of flexibility in ultimate product character and quantity which has not been possible heretofore. Other objects will appear hereinafter.

Various embodiments of the invention in its most general terms include, in combination (1) a catalytic ethylene polymerization carried out under such conditions, described hereinafter, that ethylene is converted to an alpha olefin product predominating in vinyl olefins. A particular and always-present feature of this segment of the combined process is the separation of an olefin fraction from the reaction products, said separated fraction being of lower molecular weight constituents than the desired product fraction, and the transmittal of a portion of said separated fraction at least to the second section, or chain growth section of the combined process, (2) in this portion of the process the vinyl olefin "cut" transmitted from the catalytic polymerization section is, firstly, converted to a trialkyl aluminum, and then, secondly, this trialkyl aluminum is subjected to chain growth reaction with ethylene to provide a trialkyl aluminum fraction of desired characteristics, viz., having normal alkyl groups of a desired chain length range.

The relative proportions of vinyl olefins and aluminum trialkyls is very flexible, and can be greatly varied while still retaining the reciprocal benefits enjoyed by both sections of the coordinated process. Among the factors which effect the relative proportions are the identity of the desired vinyl olefins and the desired trialkyl aluminum co-products. Another factor is the occasional withdrawal of a low molecular weight by-product from the catalytic polymerizing section. When the trialkyl aluminum desired is to have alkyl groups in the same chain length range as the vinyl olefins, a usual but non-limiting product proportion range is trialkyl aluminum amounting to from about 1 to 4 times the weight of the vinyl olefins produced.

In a particularly effective embodiment of the invention, the trialkyl aluminum generated in the chain growth section is immediately converted to primary alcohols. In this species of the invention, the amount of alcohols, relative to the vinyl olefins, is similarly subject to great latitude without negating the reciprocal benefits of the integrated process. When the most desired alcohol corresponds in chain length to the vinyl olefin product, a customary alcohol production is from about three-fourths part by weight to about five parts per part of vinyl olefins. A more usual range is from one to two parts of alcohols per part of vinyl olefins.

As mentioned above, the essence of the invention is the transfer, from the catalytic polymerization zone, of at least part of the olefins produced, to the chain growth section, the transferred olefins being of lower molecular weight than the desired olefin product. Thus, when the olefin product desired includes dodecene, tetradecene and hexadecene (herein sometimes designated as $C_{12}$–$C_{16}$, inclusive, olefins) the olefins transferred to the chain growth section can include all olefins from n-butenes to and including the decene, or $C_{10}$ olefin. In particular embodiments, only a portion of the available olefins is transferred, as, for example, octenes and decenes can be transferred and butenes and hexenes can be recycled at least in part to the catalytic polymerization step.

The transfer of olefins according to the present invention benefits not only the character and production of the vinyl olefins, but also of the trialkyl aluminum product engendered in the chain growth section. Thus, the vinyl content purity, and the desired chain lengths, of the vinyl olefins are more readily achieved. Similarly, the identity or size, of alkyl groups in the trialkyl compounds from the chain growth section is also significantly benefitted.

The principles of the invention and further understanding of the various embodiments thereof will be understood from the detailed description, working exemplification, and figures herein.

FIG. 2 is a more detailed representation of a process layout utilizing a particular embodiment of the invention applied to the concurrent synthesis of normal alpha olefins of a selected molecular weight range, and a trialkyl aluminum stream with corresponding alkyl groups and the immediate conversion thereof to monohydric primary alcohols.

Figure 1:
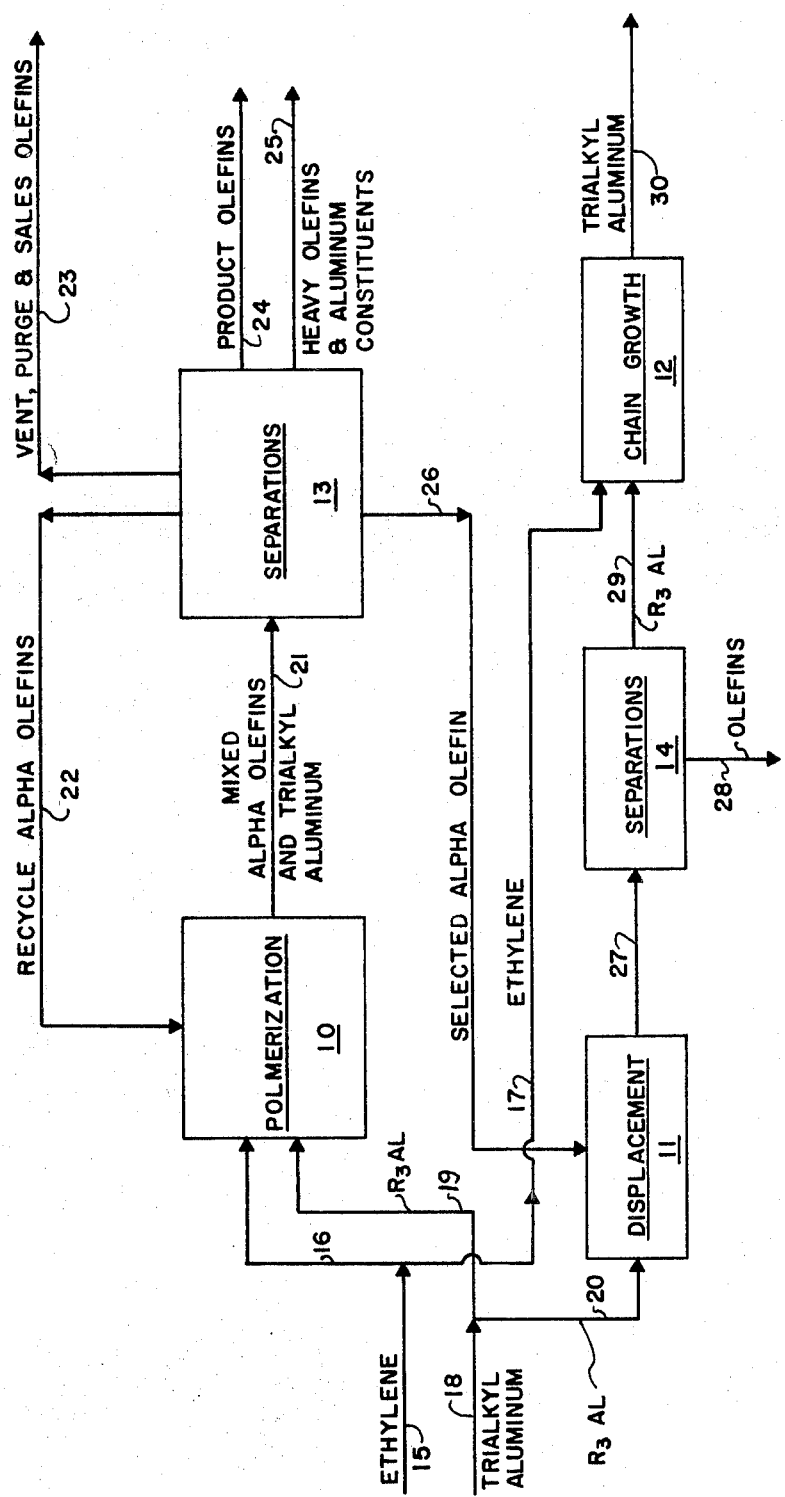
FIG. 1 is a generalized schematic representation showing the interrelationship of the catalytic polymerization operation and the stoichiometric chain growth operations to produce a trialkyl aluminum stream.

Referring to FIG. 1, this generalized, schematic flow sheet is applicable to all forms of the invention. This process includes in all embodiments, polymerization 10, displacement 11, a chain growth 12, and separations 13 and 14. Ethylene feed 15 is split into two parts 16 and 17, feeding, respectively, polymerization 10 and the chain growth 12. Trialkyl aluminum feed 18 is split into parts 19 and 20, providing respectively, catalyst for polymerization 10 and a feed stream to displacement 11.

In the catalytic polymerization step, ethylene is converted, under the influence of the trialkyl aluminum catalyst, into a mixture of higher molecular weight alpha olefins, the process being carried out under elevated temperature and pressure conditions such that a substantial number of moles of ethylene is reacted per aluminum-alkyl bond present. In other words, the trialkyl aluminum acts in a truly catalytic capacity. The reaction produces a reactor effluent comprising a mixture of alpha olefins, predominating in the vinyl alpha olefins, with the trialkyl aluminum having alkyl substituents corresponding in chain length to the distribution of olefins generated. The polymerization effluent 21 is delivered to separations 13.

The separations 13 normally involve several fractionation operations, now outlined only briefly.

Usually, but not necessarily, the separations 13 provide for removal of a recycle olefin stream 22 which is returned to polymerization 10. Also, separations 13 can provide for isolation of a vent olefin stream 23 which can be used in various ways, sold or discarded depending upon economic or other considerations. Under various conditions either or both of said streams 22 and 23 may not achieve identity separate from other streams of the process.

Separations 13 also generally isolate a product olefins stream 24 and a bottoms or heavy olefins stream 25, the latter including principally olefin hydrocarbons of higher molecular weight than the desired product fraction, as well as aluminum constituents derived from the trialkyl aluminum catalyst. In all instances, separations 13 provide a selected alpha olefin stream 26 which is delivered to the displacement 11.

The precise composition of the several streams referred to above as well as their quantity relationship depends to a large extent upon the particular needs of an operation and the characteristics of certain specific embodiments. The following description of stream characteristics is therefore, illustrative, and appreciable variation can be provided according to particular needs.

As a typical trialkyl aluminum, triisobutyl aluminum can be used. The reactor effluent stream from polymerization 10 normally is a mixture of olefins ranging from four to thirty carbon atoms, with the concentration distribution dependent to a large extent upon the conditions involved. Excess ethylene passes through the polymerization step and is flashed and recycled in the recycle alpha olefin stream 22. In the course of the catalytic polymerization, the triisobutyl aluminum 19 fed as catalyst is converted to trialkyl aluminum wherein the alkyl substituents have the same chain length distribution as the olefins themselves. This stream, passing to the separations 13, is, illustratively, divided principally into the recycle alpha olefin stream 22, predominating in olefins of four and six carbon atoms, and the product olefin stream 24 predominating and almost solely consisting of olefins of twelve to sixteen carbon atoms. Typical desired specifications for the product olefin stream 24 call for an 85 or higher weight percent concentration of vinyl olefins with the higher vinyl content, of the order of 90–95 percent being generally more desired. The aluminum constituents of the bottoms stream 25 normally are alkyl aluminum alkoxides while the heavy olefins thereof typically have eighteen and more carbon atoms per molecule.

The selected alpha olefin stream 26 is typically a cut of lower average molecular weight than the desired product olefins, a typical composition containing eight and ten carbon atom alpha olefins molecules.

In displacement 11, the selected alpha olefins 26 are reacted with trialkyl aluminum feed 20 whereby olefins corresponding to the alkyl groups of feed 20 are released, and a new trialkyl aluminum product is made, whose alkyl groups correspond to the olefins 26. The displacement effluent stream 27 from the displacement 11, then, in a typical example, includes a mixture of trialkyl aluminum compounds having octyl and decyl alkyl groups, and, isobutylene, the latter derived from the triisobutyl aluminum feed 20.

The displacement effluent is then processed in the separation 14 wherein the olefins, typically isobutylene, are removed in olefin stream 28. The resulting trialkyl aluminum stream 29 is delivered to chain growth 12. The olefins stream 28 usually includes, in addition to those olefins derived from the trialkyl aluminum feed 20 to the displacement 11, vinylidene olefin impurities as minor components in the selected alpha olefin stream 26.

In the chain growth 12, additional ethylene 17 is added to the trialkyl aluminum of stream 29 to provide a product trialkyl aluminum stream 30. Since the selected alpha olefin stream 26 was processed by separations 13 to remove all olefins having less than a chosen number of carbon atoms per molecule, typically eight, the trialkyl aluminum product of the chain growth 12 contains no alkyl groups having less than the selected eight carbon atoms. The chain growth 12 adds carbon atoms to the alkyl groups on the aluminum atoms in multiples of two. The addition occurs on a statistical probability basis with some groups remaining at the $C_8$ level, some receiving additional molecular length based upon the addition of two carbon atoms and accompanying hydrogen, others receiving a basic addition of 4 carbon atoms, others 6, 8, 10 carbon atoms increases, etc. Upon control of the ethylene feed rate and other conditions as will be more fully explained hereinafter, a peaking of the product is obtained with comparatively few groups remaining at the eight and ten carbon atom levels or proceeding beyond the sixteen carbon atom level. Close control of the product to a selected range of number of carbon atoms per alkyl group is thus possible without limitation to the feed illustration of eight and above, peaking occurring in some other range, such as twelve to sixteen carbon atoms.

In various embodiments employing the general combination outlined above and illustrated by FIG. 1, certain reciprocal advantages in both the polymerization and the chain growth are realized by control of the volume and composition of the streams involved. Firstly, the volumetric requirements of the physical container for the polymerization 10 depend to a substantial extent upon the volume of the recycle stream 22 hence optimization in this area normally suggests avoidance of large amounts of recycle. In addition the chemical characteristics of the polymerization reaction are generally benefitted by optimization of the recycle. It is usually found for example that the recycle of alpha olefins having less than the number of carbon atoms per alkyl groups desired in the trialkyl aluminum product 30, even if they are of the vinyl type, favors the generation of beta-branched or vinylidene alpha olefins in the polymerization 10. For this reason it is usually advantageous to remove the olefins having fewer carbon atoms per molecule than desired in the alkyl groups of the product stream 30. This is therefore one source of material for the vent stream 23.

In addition, control of the separation at a high level, say eight carbon atoms and above per olefin molecule, rather than at a lower level, provides a concurrent benefit viz. peaking of chain growth to produce a selected product range. In other words, if illustratively, one wishes to generate product trialkyl aluminum having alkyl groups of twelve to sixteen carbon atoms, the use of an alpha olefin stream 26 having from eight to ten carbon atoms per molecule permits a product peaking with about 80 weight percent or better of trialkyl aluminum constituents having twelve to sixteen carbon atoms in each alkyl group, whereas a similar chain growth operation starting with triethyl aluminum as a trialkyl aluminum component results in a product having only about 50 weight percent of trialkyl aluminum in said chain length range. Other advantages will appear with respect to particular embodiments.

As previously mentioned, the general principle of this invention is applicable to a variety of situations. One of the more preferred embodiments utilizing the invention in its broadest form is the concurrent production of a vinyl olefin product stream at 24, and a trialkyl aluminum product stream at 30 which latter is immediately converted to straight chain alcohols. A typical process arrangement for this embodiment is illustrated in FIG. 2 to which attention is now directed, like reference characters being used to designate correspondence with the steps of FIG. 1.

In FIG. 2 the principal components include polymerization 10, separations 13, the latter shown in greater detail than in FIG. 1, including flash 31, fractionations 32, 33, 34 and a final flash 35. In addition, are shown displacement 11, separation 14, chain growth 12 and associated streams as well as the alcohol conversion steps of oxidation 36, separation 37, hydrolysis 38, and fractionation 39. For simplicity, FIG. 2 does not show flow control, such as valves and pumps, or phase changers such as reboilers and condensers or other such auxiliary and obvious process details.

Ethylene feed 15 is provided for polymerization 10 and chain growth 12 through branches 16 and 17. Recycle alpha olefin stream 22 is shown in two parts, one being ethylene from flash 31, and the other being higher boiling olefins obtained from fractionation 32.

In the polymerization 10, operated at elevated temperatures and pressures, the ethylene is subjected to catalytic polymerization, under the influence of a trialkyl aluminum, typically triethyl aluminum, introduced as trialkyl aluminum feed 19. Flash 31 is fed by the polymerization effluent 21. Also fed to the flash 31 is an oxygen containing stream 40. The polymerization effluent includes not only olefin hydrocarbons generated by the polymerization process, but also aluminum alkyls corresponding in molecular quantity to the catalyst fed 19, the latter having alkyl substituents corresponding in chain length to the olefin generated. An oxidizing treatment provided by the oxidizing feed through line 40 converts this aluminum trialkyl to aluminum alkoxides, to avoid adverse catalytic isomerizing effect on the alpha olefins during the vaporizing and fractionating operation of flash 31 and subsequent fractionation as would be experienced were the trialkyl aluminum retained as such. On either an intermittent or a low rate continuous basis, minor amounts of low molecular weight gas which might otherwise accumulate adversely, is removed from the process through the purge 41, but otherwise the bulk of the overhead gas from the flash 31 is recycled to the polymerization 10. This overhead is predominantly ethylene, which is employed in excess in the polymerization. The bottoms stream 42 from the flash 31, then, contains the bulk of the olefin products as well as the aluminum components and constitutes the feed to the first fractionation 32.

The first fractionation 32 separates an overhead fraction consisting of a portion only of the olefins of lower molecular weight than the desired product olefins. The particular desired olefin products generally will vary in identity according to market needs and other factors. For purposes of illustration herein, the desired product stream is a mixture consisting essentially of alpha olefins of twelve to sixteen carbon atoms, inclusive, predominating in vinyl olefins, and purities of such in the order of 90 to 95 percent can be readily achieved. The process is readily adaptable to production of other similar end products. For example, the product cut can readily be shifted to encompass 14–22 carbon olefins, 10–14, or 16–20, etc.

The overhead from the fractionation 32 then, illustratively, is predominantly an n-butene rich stream, which is recycled to feed to polylmerization 10. A portion or all of this stream can be taken off, if desired, as stream 43, this stream being available for use in other operations or for marketing. Occasionally, side streams of particularly desired compositions are withdrawn through supplemental take-off lines such as in the case of a typical stream 44.

The bottoms stream 45 from the fractionator 32 is fed to the second fractionation 33 which makes a second cut between an intermediate olefin fraction and the heavier olefins and aluminum components. The overhead comprises the selected alpha olefins feed stream 26 for the chain growth section. The bottoms stream 46 from this fractionation 33 passes to the final fractionation 34, which makes a final cut, producing as overhead a high vinyl content alpha olefin product stream 47 of the desired molecular weight range which is discharged to product tankage or to immediate use. In general it corresponds to the product olefins stream 24 of FIG. 1. The bottoms stream 48 from the final fractionation 34 consisting essentially of aluminum alkoxide and alpha olefins of higher molecular weight than the desired product fraction is fed to a final flash chamber 35 which makes a final separation releasing the high molecular weight olefins as an overhead stream 49. The bottoms stream 50 contains aluminum alkoxides which, in this embodiment, are introduced to hydrolysis 38 of the alcohol section which operates from the output of the chain growth 12.

In the chain growth section, the selected olefin stream 26 from the polymerization section, which is of lower average molecular weight range than the desired olefin product stream, is passed, as indicated, to the displacement 11. Also supplied to the displacement 11 as feed 20 is a trialkyl aluminum usually in stoichiometric deficiency to the quantity of olefins provided by the stream 26 for complete displacement. In addition the displacement 11 receives a recycle stream 51 which will be described subsequently. In the displacement 11 the vinyl alpha olefins react with the trialkyl aluminum, and generate in good yield a trialkyl aluminum constituent wherein the alkyl groups correspond to the olefins 26 provided. The displacement effluent stream 27 is then discharged to the separation 14 which may be merely a "flash" operation. The separation 14 releases an overhead olefin stream 28 containing olefins corresponding to the alkyl groups of the trialkyl aluminum feed 20. A side stream of vinyl alpha olefin, representing the excess over that consumed in the displacement reaction, is returned as the previously mentioned recycle stream 51 to the displacement 11. The bottoms stream 29 from the separation 14, consisting essentially of trialkyl aluminum, is fed to the chain growth 12, wherein it is reacted with ethylene provided by ethylene feed part 17. The effluent product stream 30 from the chain growth 12 is supplied as feed to oxidation 36.

For the oxidation 36 an oxidizing gas 60, typically oxygen or air, is introduced to convert the aluminum trialkyls to aluminum trialkoxides. A flash vaporizing step is customarily introduced at this point to separate non-reacted ethylene for recycle. Inerts and high volatility components are thus discharged as overhead 61, and the aluminum trialkoxide product is discharged as a bottoms stream 62 for transfer to separation 37 for further separation between unreacted hydrocarbons and aluminum trialkoxides, the hydrocarbons being discharged as overhead 63, the bottoms 64 passing to hydrolysis 38.

In the hydrolysis operation, dilute aqueous acid is fed at 65 to be reacted with the aluminum trialkoxide, forming an aluminum salt or hydrate together with a nonaqueous phase containing alcohols corresponding to the alkoxide groups of the trialk-oxide components. The aqueous phase is removed as stream 66 while the phase 67 alcohol is withdrawn and fed to final fractionation 39 for separation into desired alcohol cuts. The lower molecular weight cut is discharged as overhead 68 while the heavier alcohols 69 are discharged as bottoms.

To further illustrate the operation of an embodiment of the process as above described in the illustration of FIG. 2, the following working example is typical.

Example

In this embodiment, the polymerization 10 is conducted at a temperature in the range of about 180–200° C., while the pressure is maintained between 2500 and 3500 pounds per square inch. The net feeds to the reactor include the combined ethylene feeds 16, which includes a portion originating in the main feed 15, and the ethylene-predominant recycle stream 22, the quantity of ethylene in the recycle stream being from 4 to about 2.5 times the net ethylene feed (from 15) to the polymerization 10. The proportion of triethyl aluminum fed to polymerization 10 corresponds to roughly from 1 to 3 pounds of triethyl aluminum per 100 pounds of the net ethylene reacted. In this particular operation, the desired concurrent end products are a vinyl alpha olefin stream consisting essentially or predominantly of components of 12 to 16 carbon atoms, the mixture having a vinyl olefin content of about 90 mol percent or higher. In a typical operation of this character, the distribution of the net ethylene reacted to streams transferred from the polymerization 10, or released as products therefrom usually runs about as follows:

| Stream: | Quantity, lbs. per 100 lb. ethylene consumed |
|---|---|
| Product— | |
| $C_{12-16}$ Olefins | 24 |
| Olefins to chain growth— | |
| Hexenes | 25 |
| Octenes | 20 |
| Decenes | 15 |
| High M.W. olefins— | |
| $C_{16}$ and $C_{16}+$ | 11 |
| Alkyl Groups of Catalyst | 3 |

About two or three percent of the net ethylene feed is lost in miscellaneous vent operations or other minor losses.

Sufficient oxygen is fed at stream 40 to convert at least two of three alkyl groups present on the aluminum alkyl constituent to the corresponding alkoxide, although it has also been discovered that this degree of conversion is not essential, and that the proportion of oxygen can be even lower, corresponding to roughly about one alkoxide radical produced per mol of the aluminum trialkyl remaining in the effluent stream.

The flash fractionation 31 occurs at a relatively low pressure, of the order of about 500–600 pounds per square inch, with a bottoms temperature of approximately 150–170° C. The overhead stream 32-A is predominantly ethylene, in this example no side stream being withdrawn at purge 41, and all of the overhead ethylene being returned in recycle stream 22 to pass again through polymerization 10.

Fractionation 32 can be considered as a debutenization with a butene fraction being taken as overhead as part of recycle 22. This operation of fractionation 32 is conducted as approximately 100 pounds per square inch pressure, with a bottoms temperature of about 210–240° C. In this example the side stream 43 is not withdrawn.

The fractionation 33 operates at a pressure of about one atmosphere with a bottoms temperature of about 220–230° C. The overhead from this operation typically consists of a mixture of alpha olefins of the following approximate composition:

| Component: | Mol percent |
|---|---|
| Hexenes | 51 |
| Octenes | 31 |
| Decenes | 18 |

The bottoms from this fractionation 33 consists predominantly of olefins of twelve and more carbon atoms, plus the aluminum alkoxide which has been carried through the preceding recovery sequence always in the higher boiling or bottoms stream.

The product fractionation 34 is carried out at reduced pressure, of the order of 0.1 atmosphere, the bottoms temperature being about 230–250° C. The overhead product stream consists of an alpha olefin mixture of about 90 mol percent or higher vinyl purity having the following distribution in a typical instance:

| Component: | Mol percent |
|---|---|
| Dodecene | 50–52 |
| Tetradecene | 30–32 |
| Hexadecene | 20–16 |

The heavy olefins of stream 49 consists of olefins of 18 or more carbon atoms with components of up to about 30 carbon atoms, in minor concentration. Aluminum trialkoxide is the major component in the bottoms 50 from the final flash 35 which passes to the hydrolysis 38.

The trialkyl aluminum feed 20 for displacement 11 is of the beta branched alkyl substituent type, typically triisobutyl aluminum, which trialkyl species is particularly susceptible to ready reaction with a straight chain alpha olefin to release trialkyl compounds, the alkyl groups corresponding to the alkyl radicals of the displacing olefins. Typical details of such an operation are described in U.S. Patent 2,835,689.

Isobutylene is then the principal component of stream 28 from separation 14 and the recycle 51 is the non-reacted mixture of hexenes, octenes, and decenes, corresponding generally to the basis of the selected alpha olefin stream 26. Approximately 50 percent of the gross olefin feed is reacted per pass in displacement 11 and a high conversion of triisobutyl aluminum to the tri-n-alkyl aluminum compounds is achieved. The bottoms stream 29 from separation 14 is a relatively concentrated stream of the aforementioned tri-n-alkyl aluminum compounds.

The relative proportions of ethylene 17 and trialkyl aluminum streams 29 fed to the chain growth 12 are from 7 to 10 mols per mol of the tri-n-alkyl aluminum. Alternatively expressed, ethylene is reacted in proportions of about 2.3 to 3.3 mols per alkyl group. The reactor effluent stream 30 is a tri-n-alkyl aluminum stream, the distribution of the alkyl groups in this example being approximately as follows:

| Alkyl length: | Mol percent |
|---|---|
| $C_6$ | 2 |
| $C_8$ | 10 |
| $C_{10}$ | 22 |
| $C_{12}$ | 26 |
| $C_{14}$ | 20 |
| $C_{16}$ | 11 |
| $C_{18}$ and higher | 9 |

The aluminum trialkyls generated in the chain growth 12 are converted to the corresponding aluminum trialkoxides by oxidation 36. Inerts, if present in the oxygen-containing stream 60 are released overhead through the vent line 61 while any residual unreacted olefins removed by separation 37 are discharged through line 63 or recycled as to the selected alpha olefin stream 26.

Hydrolysis 38 employs a dilute mineral acid, such as sulfuric acid or hydrochloric acid, to convert the aluminum trialkoxides to the corresponding alcohols and aluminum (sulfates).

Fractionation 39, shown as a single step, can include not only one fractionator but several in series to provide the desired alcohol cuts.

A typical weight distribution of alcohols is as follows:

| Component: | Weight percent |
|---|---|
| Lower alcohols— | |
| Hexyl alcohol | 1 |
| Octyl alcohol | 6 |
| Decyl alcohol | 18 |
| Detergent range alcohols— | |
| Dodecyl alcohol | 25 |
| Tetradecyl alcohol | 22 |
| Hexadecyl alcohol | 14 |
| Heavy alcohols— | |
| Octadecyl and higher alcohols | 14 |

The detergent range alcohol fraction is the favored product in this example, the quantity of alcohols in this fraction, relative to the quantity of vinyl olefins, being about 370–440 lbs. per 100 lbs. of olefins.

As previously described and as evident, the precise identity of the desired product stream can be varied according to the peculiarities of each installation or according to a market situation at any particular time. In all instances, the common characteristic of the combined operations is that a fraction of alpha olefins, generated by polymerization, is separated from that reactor effluent mixture and that said olefin stream is of lower molecular weight than desired olefin product fraction and is fed as a starting material in the displacement portion for the chain growth section of the combined operations. Within this principle, it is perfectly expedient to alter the operation of the polymerization to produce, as a preferred product stream, an alpha olefin stream of, typically, decene to tetradecene as the preferred product, while at the same time operating the chain growth section to produce aluminum trialkyls predominating in alkyl groups of twelve to sixteen carbon atoms, or alternatively, of fourteen to twenty carbon atoms, etc. In brief, the process is readily adaptable to adjustment to alter the identity of each of the principal product streams, viz., the vinyl olefins and the trialkyl aluminum from the chain growth section (or alcohols directly derived therefrom).

In addition to the ability to alter the product identities, the relative proportions of desired fractions can be adjusted by providing for additional withdrawal of side streams when these can be marketed or independently utilized. Thus, in the preceding example, by withdrawing a butene stream 43 as it is fractionated out by 32, the yield of the dodecene-hexadecene vinyl olefins fraction is increased and the vinyl purity is increased.

As a further illustration, when a hexene rich by-product stream is withdrawn at 44 from the debutenizer fractionation 32, then the selected alpha olefins stream 26 is predominantly octenes and decenes. The elimination of hexene from this stream results in a further increase in specificity of the alkyl groups provided in the chain growth reaction. Thus, instead of the alcohols being produced as in the preceding with 61 weight percent in the $C_{12-16}$ range, the concentration increases to 67 or 70 weight percent in that range. If the olefin stream 26 is essentially decene only the fraction of desired alcohols increases to about 74 weight percent.

The relative proportions of alcohols (or alkyl groups) to olefins produced can also be varied. Instead of 375 to 400 lbs. of alcohols per 100 lbs. of olefins, the ratio can be from 100 to 500 lbs. per 100 lbs. dependent on the identity of the products and the withdrawal of by-product streams.

As already noted, the combination of the present invention provides particularly beneficial results with respect to both the polymerization operation and with respect to the production of aluminum trialkyls in the chain growth operation. The reason for the advantages, while not entirely clearly understood, is attributed to certain peculiarities of both operations.

As to the polymerization section, while all alpha olefins lower than the desired fraction can be recycled to polymerization 10 with good results, it is found that it is increasingly difficult to obtain the desired vinyl purity of the required product fraction as the recycled olefins approach the molecular weight of said desired fraction. It is believed that the benefit, by this selective reduction in the recycle of the portion of the alpha olefins is a result of several factors. An alpha olefin in contact with a trialkyl aluminum, under elevated pressure and temperature conditions, can react in several different ways. Firstly, it is susceptible to addition to aluminum hydride bonds which means that it then re-establishes a nalkyl group corresponding to the olefins. On the other hand, it is susceptible to the addition to the alkyl aluminum bonding already existent in which instance a vinylidene type alkyl is established, and as hitherto discussed, the vinylidene end products are undesired contaminants.

Considering the possibilities when individual vinyl olefins are recycled to the polymerization operation in the case of n-butene-1, reaction with an 8, 10 or 12 carbon alpha olefin (or aluminum alkyl group) can result in a vinylidene olefin in a product range of dodecenes to hexadecenes. In the case of recycled decene, a comparable interreaction with a two, four, or six carbon olefin would also result in a vinylidene olefin in the product range. Since the possible reactions are three in each instance, it would be expected that the removal of any or all of the lower-than-desired olefins from the polymerization recycle would be beneficial, and this is the case.

The most preferred forms of the invention take further advantage of a characteristic of the polymerization process, however. This characteristic is, that the number of mols (or molal concentration) of olefins increases with decreasing chain length. Thus the concentration of butene in the polymerization and in the effluent stream is very much greater than the concentration of octene, etc. As the higher molecular weight olefins, reacting with the lower molecular weight olefins, tend to form vinylidene olefins in the product range, than a reduction of the higher olefins returned to the polymerization zone has an accenting effect on product purity. A particularly preferred form of the invention, then, involves the transfer from the polymerization to the displacement of a lighter-than desired olefin fraction immediately adjacent the desired product range. Such an embodiment is illustrated in the working example.

When the desired product olefins are, for example, tetradecene and hexadecene, it is then preferred to select at least the dodecene, and desirably the dodecene, decene, and octene components for delivery to the displacement operation rather than permit the recycle of these to the polymerization.

With respect to the benefits of the avoidance of polymerization recycle of these olefins, benefits are also realized by using them as feed for the displacement and chain growth operations. These advantages stem from the fact that by initiating a chain growth reaction with an aluminum trialkyl having no alkyl groups in the lower end of the spectrum, the specificity of the final aluminum alkyl generated is greatly increased. Illustratively, when aluminum alkyls are realized by chain growth, starting with a mixture of hexenes, octenes, and decenes as in the example, the ratio of the alkyl groups in the trialkyl generated, of the twelve to sixteen atom length, to all others, is in the proportion of about 132 mols per 100 mols all others. On the other hand, when the chain growth is initiated with triethyl aluminum, illustratively, and sufficient ethylene is reacted therewith to obtain a "peak" at the same point, the distribution of the desired alkyl groups to all others is in the range of about 80–82 mols per 100 mols of non-desired groups. In other words, by employing as a feed stream to the displacement and chain growth operations the olefin stream withdrawn from the polymerization as above described, the product distribution is improved by a factor of about 60 percent or higher.

The precise conditions employed in the various reaction zones are not highly critical and to a certain extent are already known in the art. The polymerization requires interrelated pressure and temperature conditions and only a partial reaction of the ethylene feed thereto, in order to insure that the olefins generated will at least predominate in the vinyl species. The pressure should be above the pressure expressed by the relation $P = 33.5\ T - 5400$ or 700 pounds per square inch whichever is higher and below the pressure expressed by the relation $P = 60\ T - 7700$ or 4000 pounds per square inch whichever is lower, wherein P above is pressure in pounds per square inch and T is temperature in ° C.

From the foregoing, it is seen that a pressure above 700 pounds and below 4000 pounds per square inch is always desirably involved in the polymerization. In order to achieve a particularly high degree of vinyl olefin constituents in the alpha olefins generated, a preferred combination is pressure from 2000 to 4000 pounds per square inch, and temperature between about 170 and 225° C. An even more preferred range of conditions is from about 180 to 200° C. operating temperature and between about 2500 and 3500 pounds per square inch total pressure. Further, as illustrated by the example, it is highly desirable to provide ethylene in excess to the reaction zone, so that the reactor effluent always includes an appreciable quantity of unreacted ethylene.

It will be understood by those skilled in the art that a particular trialkyl aluminum catalyst for polymerization 10 is not critical. A particularly economical trialkyl aluminum catalyst is triethyl aluminum, but for catalytic purposes dialkyl aluminum hydride or other such trialkyl compounds, are effective. Indeed, as the catalyst component composition changes during its passage through the polymerization zone, it is concluded that the effective catalyst moiety is the aluminum-carbon bond of an aluminum alkyl grouping or an aluminum-hydrogen bond in an aluminum hydride. Under the rigorous conditions of catalytic polymerization these latter bonds are almost invariably converted into aluminum alkyl groups as an incidental side reaction of the polymerization process. The other metallo-organic compounds of U.S. Patent 2,835,689 can be substituted as polymerization catalysts for the aluminum type catalysts, although generally such alternatives are appreciably more expensive.

The displacement operation per se is similarly known in the art. A typical mode of conducting the displacement type of reaction is described in Belgian Patent 594,803 and involves operation at a relatively elevated temperature employing an extended length tubular reaction zone. Another mode of carrying out a displacement process as required in the present invention involves the use of a supported metal catalyst, typically colloidal nickel on an inert carrier such as kieselguhr, alumina, or silica. Typical conditions when carrying out a displacement process according to this mode of operation involve a temperature of the order of 150–200° C., and operating pressure of 1000–1500 pounds per square inch. As indicated in the example, the preferred mode of carrying out the aluminum alkyl synthesis starting with the alpha olefin stream derived from the polymerization section is to employ as the initial trialkyl aluminum a component having beta branched alkyl groups thereon, because such are very susceptible to ready displacement by normal alpha olefins. On the other hand, the process of displacement is quite effective when the original alkyl groups themselves are lower n-alkyl groups. One technique for carrying out a displacement of this character is that described in U.S. Patent 2,962,513 which permits the use of triethyl aluminum, or some other ethyl aluminum compound, as the original alkyl aluminum fed to the displacement zone.

The chain growth process wherein trialkyl aluminum compounds are generated from the intermediate trialkyl aluminum component derived in the displacement reaction is, generally, known in the art. For example, the chain growth type of reaction is described in Belgian Patents 597,314 and 553,721, and in U.S. Patent 2,977,381.

In the reaction zones, viz., the catalytic polymerization, the displacement reaction, and the chain growth reaction zones, adequate provision must be made to assure the safe operability, according to the usual best recognized practices. The chain growth reaction is perhaps particularly sensitive and careful provision should be made for cooling and for pressure relief to avoid the consequences of possible run-away reactions.

From the foregoing it is obvious that considerable modification of the invention is possible without exceeding the scope thereof as defined in the appended claims.

What is claimed is:

1. In a process for producing high vinyl purity higher olefins from ethylene by processing including catalytic polymerization, the improvement of
  (a) catalytically polymerizing ethylene to produce an olefin mixture of butene-1 and higher olefins which are predominantly vinyl,
  (b) separating the olefin mixture into three principal categories which are:
    (1) a higher molecular weight product category,
    (2) an intermediate molecular weight category, and
    (3) a low molecular weight category, the categories being related in such manner that substantially all dimers involving olefins of the third category with co-present olefins higher than ethylene fall in the molecular weight range of the intermediate category and
  (c) adding further ethylene to olefins of at least one of the second and third categories subject to the limitation that where addition is made to olefins of the third category it is by catalytic polymerization separate from the addition of ethylene to olefins of the second category.

2. In a process in accordance with claim 1, the improvement wherein the higher molecular weight category is olefins of predominantly 12–16 carbon atoms per molecule, the intermediate molecular weight category is olefins of predominantly 8 to 10 carbon atoms per molecule, and the low molecular weight category is olefins of predominantly 4 to 6 carbon atoms per molecule.

3. In a process in accordance with claim 1, the improvement wherein the higher molecular weight category is olefins of predominantly 12–16 carbon atoms per molecule, the intermediate molecular weight category is olefins of predominantly 6 to 10 carbon atoms per molecule, and the low molecular weight category is olefins of predominantly 4 carbon atoms per molecule.

4. In a process in accordance with claim 1, the improvement wherein addition of ethylene to olefins of the third category in step (c) is concurrent with the foregoing catalytically polymerizing step and the same environment.

5. In a process in accordance with claim 1, the improvement wherein the product of the addition of ethylene to the olefins of the third category in step (c) constitutes additional olefin mixture for step (b).

6. In a process in accordance with claim 1, the improvement wherein in step (c) ethylene is added to olefins of the second category by first adding the olefins to aluminum to form the corresponding aluminum alkyl material and then chain growing with ethylene to produce higher alkyl aluminum alkyl material.

7. In a process in accordance with claim 1, the improvement wherein the addition of ethylene to olefins of the third category is by catalytic polymerization concurrent with the foregoing catalytically polymerizing step and the same environment, and ethylene is added to olefins of the second category by first adding the olefins to aluminum to form corresponding aluminum alkyl material and then chain growing with ethylene to produce higher alkyl aluminum alkyl material.

References Cited
UNITED STATES PATENTS

| | | | |
|---|---|---|---|
| 2,813,917 | 11/1957 | Sharrah | 260—671 |
| 2,699,457 | 1/1955 | Ziegler et al. | 260—683.15 |
| 2,892,858 | 6/1959 | Ziegler | 260—448 |
| 2,959,607 | 11/1960 | Werber et al. | 260—448 |
| 2,962,513 | 11/1960 | Meiners et al. | 260—448 |
| 3,030,402 | 4/1962 | Kirshenbaum et al. | 260—448 |
| 3,042,696 | 7/1962 | Aldridge | 260—448 |

TOBIAS E. LEVOW, *Primary Examiner.*

H. M. S. SNEED, *Assistant Examiner.*